United States Patent [19]

Channell

[11] Patent Number: 5,048,896
[45] Date of Patent: Sep. 17, 1991

[54] MINIMUM PROFILE HOIST

[76] Inventor: Glenn L. Channell, 3739 S. County Rd. 7, Loveland, Colo. 80537

[21] Appl. No.: 184,045

[22] Filed: Apr. 20, 1988

[51] Int. Cl.⁵ .................................................. B60P 1/16
[52] U.S. Cl. ............................................ 298/22 J; 254/124
[58] Field of Search ................... 298/19 B, 22 D, 22 J; 254/8 B, 8 R, 9 B, 9 R, 122, 124

[56] References Cited

U.S. PATENT DOCUMENTS

| | | | |
|---|---|---|---|
| 2,094,521 | 9/1937 | Biszantz | 298/22 D |
| 2,143,291 | 1/1939 | Wachter | 298/22 D |
| 2,314,531 | 3/1943 | Wachter | 298/22 D |
| 2,635,004 | 4/1953 | Shadwick | 298/22 D |
| 3,871,706 | 3/1975 | Odom | 298/22 J X |
| 4,302,050 | 11/1981 | Jones | 298/22 J |

FOREIGN PATENT DOCUMENTS

| | | | |
|---|---|---|---|
| 221753 | 9/1958 | Australia | 298/22 J |
| 2382399 | 9/1978 | France | 298/22 J |
| 837620 | 6/1960 | United Kingdom | 254/124 |

OTHER PUBLICATIONS

Bulletin No. 2, Brochure from Hoist and Body Division, Garwood Industries, Inc., Detroit, Michigan, Oct. 15, 1937.

Primary Examiner—Robert J. Spar
Assistant Examiner—Janice Krizek
Attorney, Agent, or Firm—James R. Young

[57] ABSTRACT

An improved scissors-type hoist for dump truck bodies comprises an upper frame and a lower frame pivotally connected at a scissors axis. One end of the upper frame opposite the scissors axis is pivotally attached to the dump body, and one end of the lower frame opposite the scissors axis is pivotally attached to the truck chassis. A force multiplying power hinge assembly comprises an elongated guide link pivotally attached at one end to the lower frame and a lift link pivotally attached at one end to the upper frame, the other ends of the guide link and lift link being pivotally connected together. A hydraulic cylinder is pivotally connected at one end of the lower frame and at the other end to the pivotally connected guide and lift links.

14 Claims, 7 Drawing Sheets

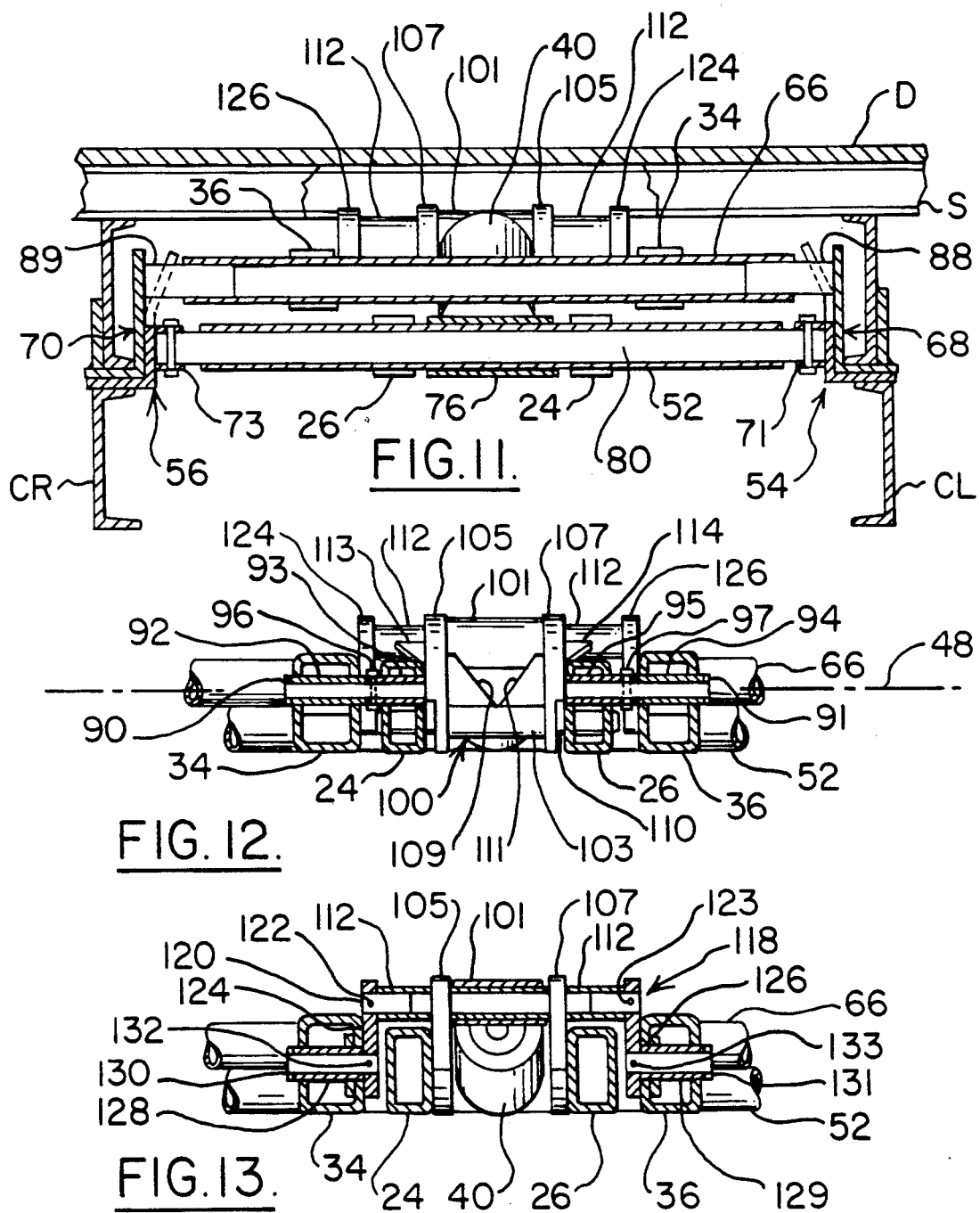

MINIMUM PROFILE HOIST

BACKGROUND OF THE INVENTION

1. Field of the Invention

The present invention relates to power hoists or lifts and more specifically to a low-profile, compact hydraulic hoist for dump truck bodies.

2. State of the Prior Art

There are a variety of known styles and structures of hoists for dump truck bodies. One common hoist style that has gained wide spread popularity and acceptance over the past three decades is known as a "scissors hoist", the configuration and action of its frame and lift arms being reminiscent of a pair of scissors. The popularity of the common scissors hoist, a typical example of which is illustrated in FIG. 2, has been due primarily to a combination of attributes, including its relative stability, general compactness when folded so that it is generally not visible externally when collapsed to the down position, its effective operation with one hydraulic cylinder, and its overall cost effectiveness and reliability. Essentially, as shown in FIGS. 2 and 3, the common scissors hoist 1 mounts on top of the truck chassis frame C, under the floor or deck D of the dump body B, and between the two longitudinal dump body frame members LL and LR.

In spite of the popularity of the conventional scissors-type hoist, there are also a number of well-known disadvantages associated with its use. For example, while it is fairly compact with respect to other, previously known hoist configurations, it still cannot be made compact enough to fit between the truck chassis C and the body B without having to cut out one or more cross sills S, as shown in FIG. 2, and still be able to handle normal loads.

The primary reason for this limitation is illustrated in FIG. 4, in which the conventional scissors-type hoist is shown in its collapsed position, i.e., with the truck body B in the normal, unraised condition. In this illustration, the weight W of the body B and any load contained therein acts vertically downward through upper mount pin 2 at the distal end of upper frame member 1. The lift force F applied by the hydraulic cylinder 3 is applied to load pin 4 positioned above a line 5 that extends through cylinder mounting pin 6 and scissors hinge pin 7. The lift force F is applied to load pin 4 in the direction of a line 8 extending through cylinder mounting pin 6 and load pin 4. Therefore, the lift force F can be resolved into its vertical and horizontal components $F_v$ and $F_h$, respectively, acting on load pin 4 as a function of the angle $\theta$ between line 8 and horizontal. In the collapsed condition shown in FIG. 4, the line 5 is substantially horizontal; therefore, the angle $\theta$ is between lines 5 and 8.

As illustrated in FIG. 4, therefore, the lift force F can be resolved into a vertical component $F_v = F \sin\theta$, and into a horizontal component $F_h = F \cos\theta$. In solving the moments about hinge pin 7, $$W \times d_1 = (F_v \times d_2) + (F_h \times h) \tag{1}$$

or $$W \times d_1 = (F\sin\theta \times d_2) + (F\cos\theta \times h) \tag{2}$$

Therefore, solving for lift force F required to lift the weight W, $$F = \frac{W \times d_1}{(\sin\theta \times d_2) + (\cos\theta \times h)} \tag{3}$$

Consequently, if the load pin is moved closer to line 5, the force F required to lift weight W increases dramatically. Hence, the load pin 4 has to be kept a practical height h above line 5 in order for the hoist 1 to work under normal conditions and with normal loads. This requirement in practice prohibits the load pin 4, thus the height of the hoist 1, from being reduced enough to avoid having to cut out cross sills S of the body B when the hoist is being mounted on the truck T. The disadvantages of cutting out cross sills S include possible compromises in the structural integrity of the body B, increased labor costs for hoist installation, and the like.

A modified scissors-type hoist 10, as shown in FIG. 5, commonly known as the "drop hinge" type of scissors hoist, was developed to solve these problems. The drop hinge scissors hoist 10 still has the same basic structure with the load pin 4 positioned above a line 5 extending between cylinder mounting pin 6 and hinge pin 7 to get the required mechanical advantage. However, the upper frame member 9 and lower frame member 12 have a downwardly bent "dog leg" portion 11 that extends below the top of chassis C, so that hinge pin 7 can be positioned some distance below the top of the chassis C, thus lowering line 5 substantially. With line 5 lower, load pin 4 can also be lowered enough to keep the lift arm or upper frame member 9 below the cross sills S while still maintaining the required mechanical advantage. Thus, the cross sills S do not have to be cut or modified to accommodate the hoist 10.

While the drop hinge scissors hoist 10, as described above, solved some of the problems encountered with the conventional scissors hoist 1 by dropping a portion of the hoist and the hinge below the top of the chassis C, that solution is no longer as attractive as it was several years ago. The problem now is that truck chassis are not only being built more compactly than in previous years, but more factory-installed equipment, such as exhaust components, catalytic converters, mufflers, tail pipes, fuel systems component, and the like are being packed by the truck manufacturers into the limited space between the chassis frame members. Thus, when the time comes to install a hoist in the after market, very often there just is not sufficient space left between the chassis frame members to accommodate the "dog leg" or drop hinge part 11 of the hoist 10.

There is, therefore, a growing need for a still more compact, minimum profile scissors-type hoist that can fit almost entirely in the space above the chassis frame, between the longitudinal frame members of the body, and below the cross sills, yet which has sufficient mechanical advantage to lift the weight of the truck body with a normal-sized load therein. Prior to this invention, there was not any hoist available that could meet these requirements.

SUMMARY OF THE INVENTION

Accordingly, it is a general object of this invention to provide a more compact, minimum profile scissors-type hoist for dump truck bodies.

A more specific object of this invention is to provide a minimum profile hoist that can generally fit in the space above the chassis frame of the truck, between the longitudinal frame members of the body, and below the cross sills when in its collapsed condition, yet which can lift normal loads.

Another specific object of the present invention is to provide a hoist that has enhanced mechanical advantage, particularly at the start of lifting a load, which is also compact enough to fit between the chassis and truck body when in the lowered or collapsed mode or condition.

Additional objects, advantages, and novel features of the present invention will be set forth in part in the description that follows, and in part will become apparent to persons skilled in the art upon examination of the following or may be learned by the practice of the invention. The objects and advantages of the invention may be realized and attained by means of the instrumentalities and in combinations particularly pointed out in the appended claims.

To achieve the foregoing and other objects and in accordance with the purpose of the present invention as embodied and broadly described herein, the apparatus of this invention may comprise a modified scissors-type hoist that has a lower frame and an upper frame pivotally connected together at a scissors axis such that the one end of the upper frame is pivotally moveable upwardly and downwardly in relation to the adjacent end of the lower frame. A hydraulic cylinder is pivotally connected at its blind end to the lower frame and at its rod end to a power hinge assembly that transmits the force applied by the cylinder to the upper frame with a multiplied mechanical advantage, that is, the lift force applied on the upper frame by the cylinder through the power hinge assembly is greater than if the rod end of the cylinder was connected directly to the upper frame. The power hinge assembly includes an elongated guide link pivotally attached at one end to the lower frame and a lift link pivotally attached at one end to the upper frame member. The other end of the guide link is pivotally connected to the other end of the lift link, and the rod end of the cylinder is also connected to the guide link and to the lift link, preferably at or near the connection of the guide link to the lift link. The distance between the scissors axis and the axis of connection of the lift link to the upper frame is different from the distance between the scissors axis and the axis of connection of the guide link to the lower frame. Preferably the former distance is greater than the latter, but not so much greater as to lose the mechanical advantage provided by this arrangement. Also, the attachment of the guide link is preferably as low on the lower frame as possible to keep the overall profile of the hoist in closed or collapsed condition as low as possible.

BRIEF DESCRIPTION OF THE DRAWINGS

The accompanying drawings, which are incorporated in and form a part of the specification illustrate the preferred embodiments of the present invention, and together with the description serve to explain the principles of the invention.

In the drawings:

FIG. 11 is a cross sectional view of the upper and lower mounting assemblies of the power hinge hoist of the present invention taken essentially along line 11—11 of FIG. 6;

FIG. 12 is a cross sectional view of the scissors hinge of the power hinge hoist of the present invention taken essentially along line 12—12 of FIG. 6;

FIG. 13 is a cross sectional view of the lift link assembly of the power hinge hoist of the present invention taken essentially along line 13—13 of FIG. 6;

DETAILED DESCRIPTION OF THE PREFERRED EMBODIMENTS

Figure 1:
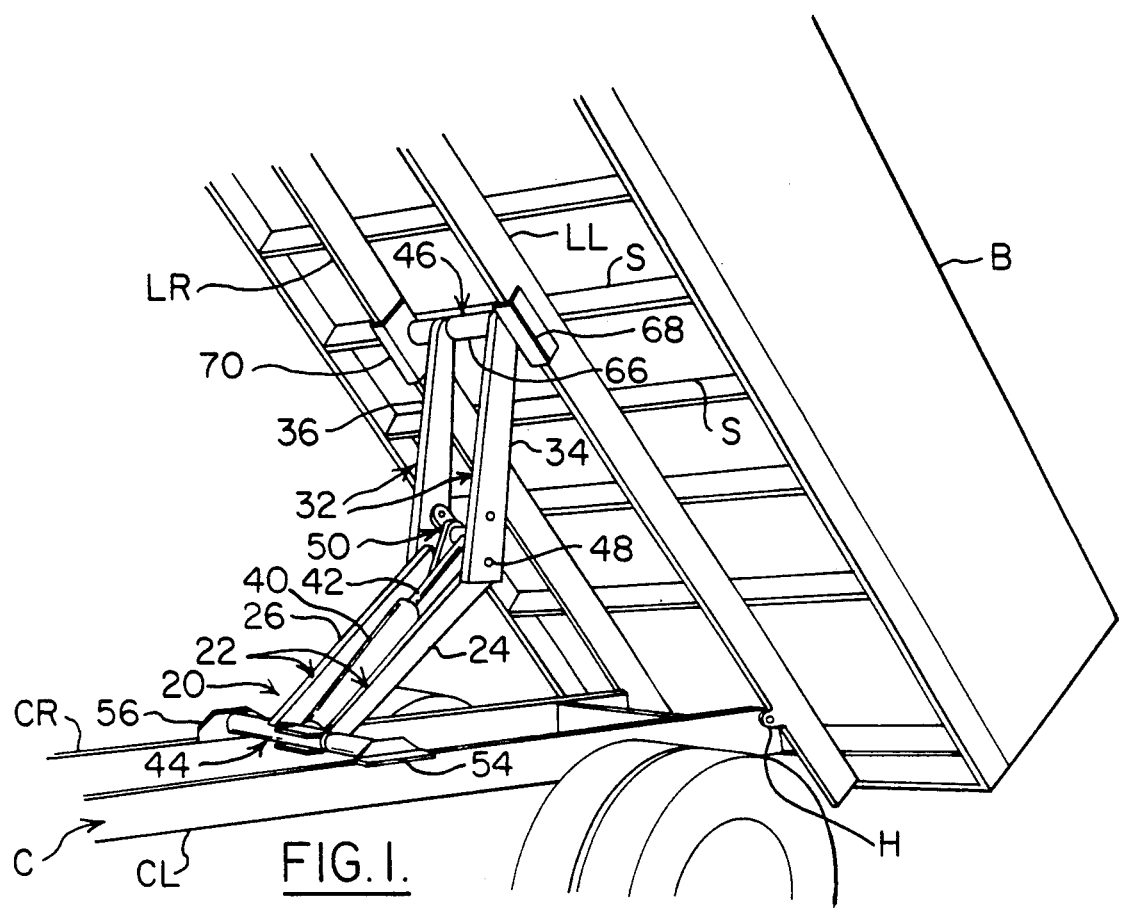
FIG. 1 is a perspective view of a truck chassis and truck body equipped with the compact, low profile power hinge hoist of the present invention shown in the raised position.
Figure 2:
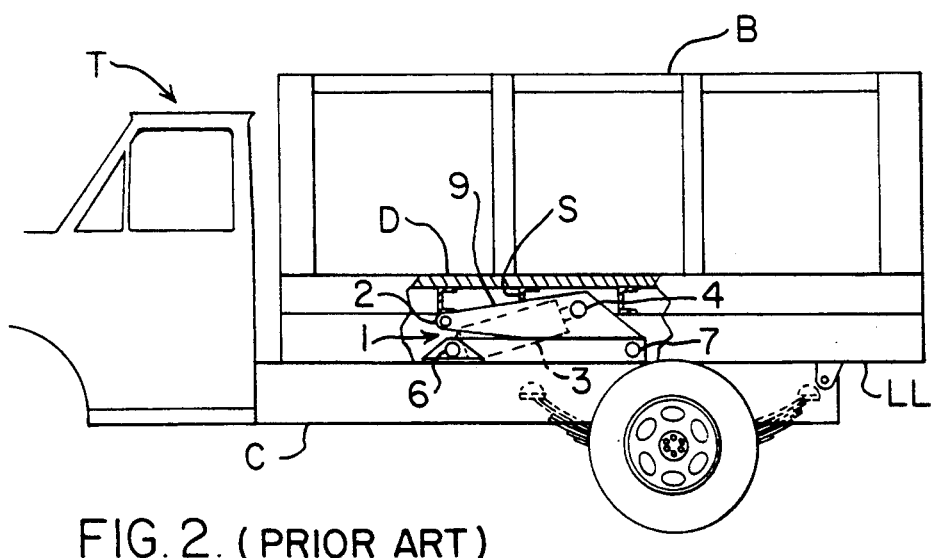
FIG. 2 is a left side elevation view of a truck equipped with a prior art scissors-type hoist.
Figure 3:
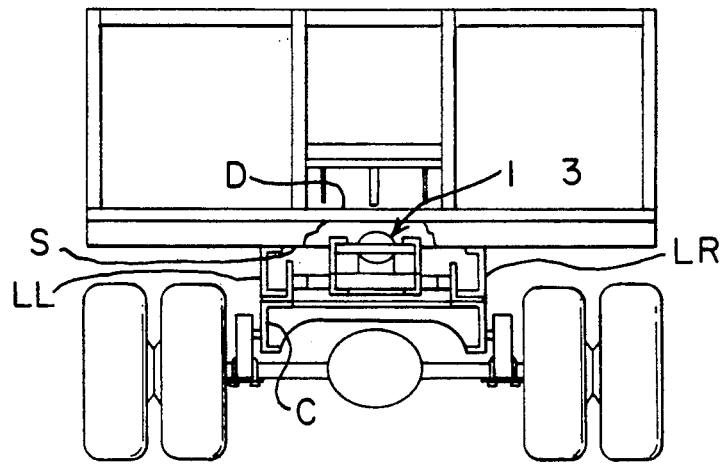
FIG. 3 is a rear elevation view of a truck equipped with a prior art conventional scissors-type hoist.
Figure 5:
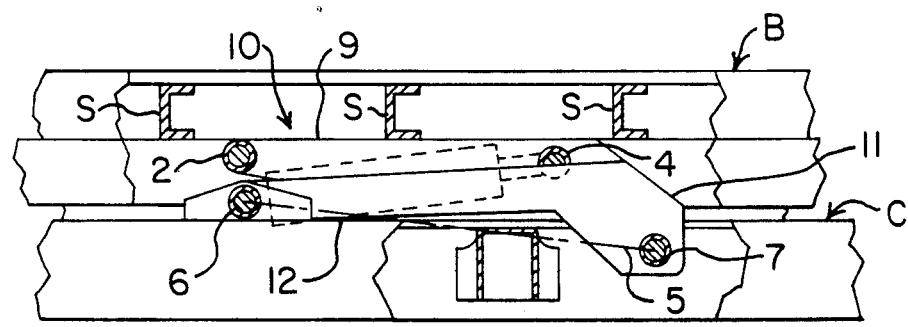
FIG. 5 is a side elevation view of a modified prior art drop-hinge scissors-type hoist mounted on a truck chassis under a truck body, with portions of the chassis and truck body cut away to reveal the structure of the hoist.

The low-profile, power hinge hoist 20 of the present invention is shown in FIG. 1 mounted on the chassis frame C of a truck and connected to a dump truck body B for raising the front of the body in a normal dumping mode. The dump body B is connected by hinges H to the rear ends of left and right chassis frame members CL and CR in a conventional manner.

The hoist 20 according to this invention is sufficiently compact and low-profile to be mounted almost completely above the chassis frame members CL, CR, almost completely below the cross sills S of the dump body B, and between the longitudinal frame members LL and LR of the body B when the hoist 20 is in its closed or collapsed condition. Yet, the power hinge assembly 50 according to this invention has a large built-in mechanical advantage at the beginning of the lift when the load on the hoist is the greatest. Therefore, besides being low in profile due to the structure of hoist 20, this hoist 20 can also operate effectively with a smaller hydraulic cylinder and with less hydraulic oil than conventional scissors-type hoists, which allows its physical size to be reduced even more.

As shown in FIG. 1, the hoist 20 is comprised essentially of a lower frame assembly 22 pivotally mounted at its proximal end on the chassis frame members CL, CR with a lower mount assembly 44. An upper frame or lift arm assembly 32 has a proximal end that is pivotally mounted at scissors axis 48 to the distal end of the lower frame assembly 22. The distal end of the upper frame assembly 32 is pivotally mounted to the longitudinal dump body frame members LL, LR by upper mounting assembly 46. A hydraulic cylinder 40 is pivotally connected at its blind end to the lower mounting assembly 44 and at its rod end to the power hinge assembly 50, which will be described in more detail below.

Figure 6:
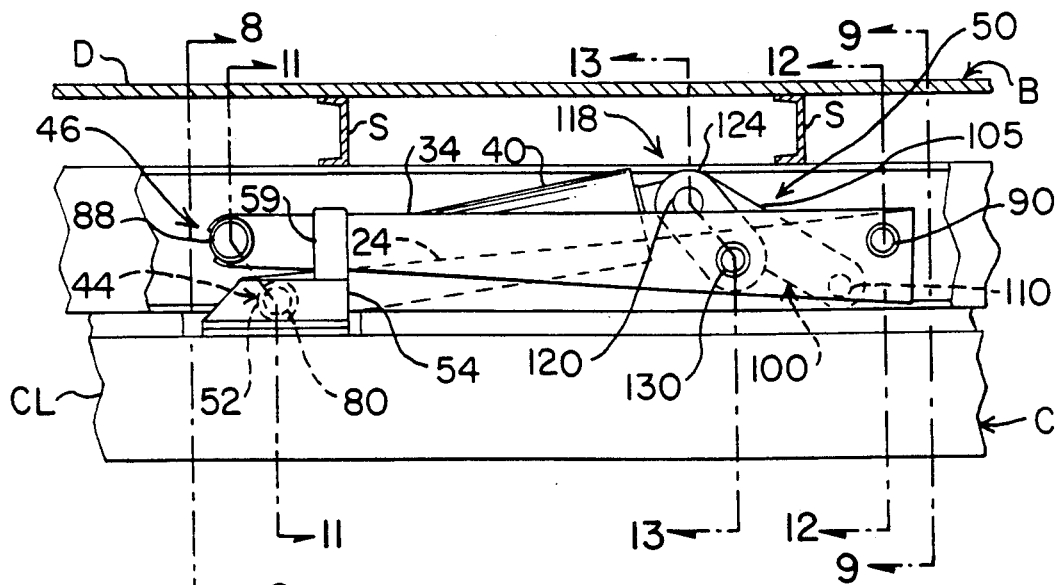
FIG. 6 is a side elevation view of a compact, low-profile power hinge hoist according to the present invention mounted on a truck chassis under a truck body, with portions of the chassis and body cut away to reveal the structure and mounting of the hoist thereon.
Figure 7:
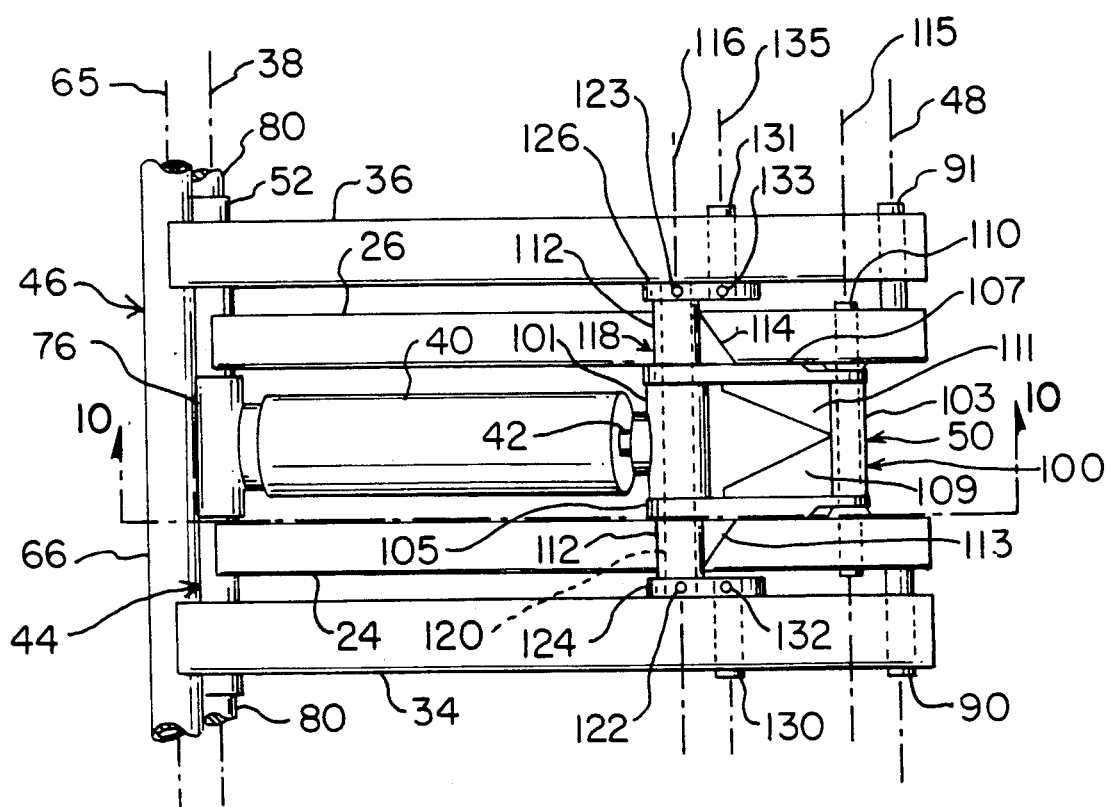
FIG. 7 is a top plan view of the power hinge hoist of the present invention.
Figure 4:
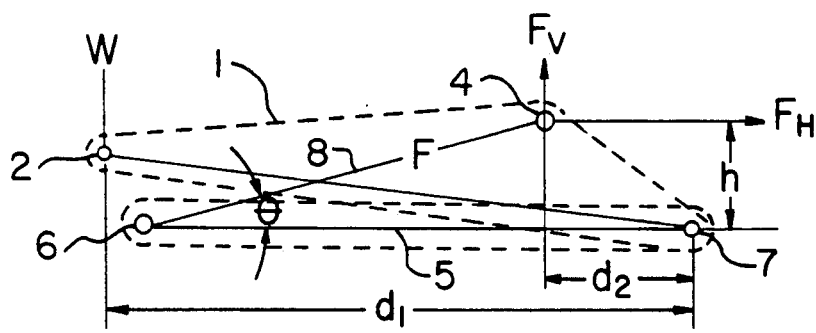
FIG. 4 is a diagrammatic side elevation view of the prior art conventional scissors-type hoist illustrating a force analysis thereon.
Figure 9:
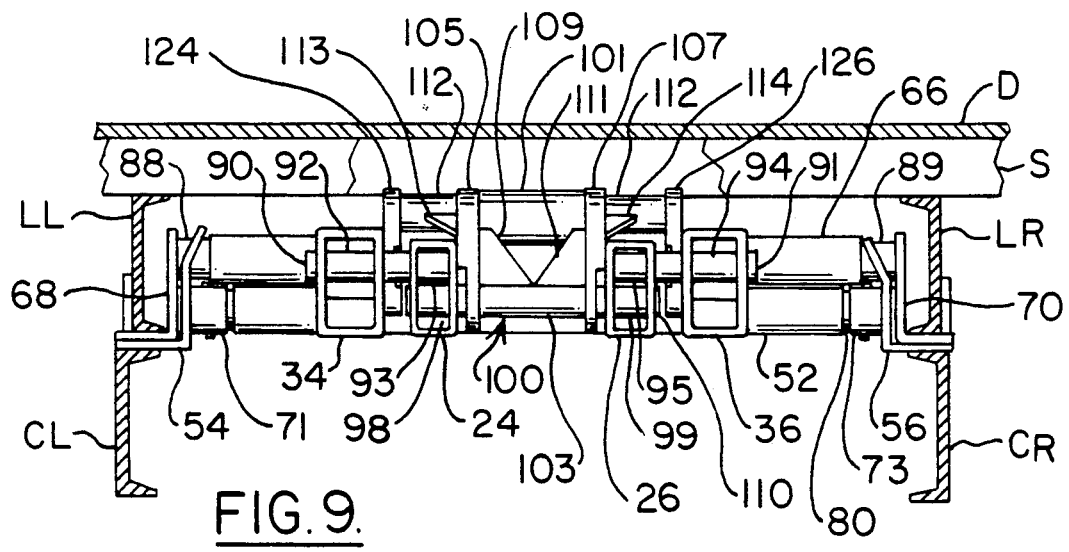
FIG. 9 is a rear elevation view of the power hinge hoist of the present invention as viewed from a section through the truck chassis and body taken along line 9—9 of FIG. 6.

As best seen in FIGS. 6 and 7, the lower frame assembly 22 is comprised of two elongated lower frame members 24, 26 extending substantially rearwardly from the lower mounting assembly 44. The upper frame assembly 32 also comprises two elongated upper frame members 34, 36 attached to and extending rearwardly from the upper mounting assembly 46. The lower frame members 24, 26 are preferably spaced a sufficient distance apart to accommodate the hydraulic cylinder 40 positioned therebetween. The upper frame members 34, 36 are spaced apart enough to accommodate the lower frame members 24, 26 positioned therebetween when the hoist 20 is folded down or collapsed.

The distal end of lower frame member 24 and the proximal end of upper frame member 34 are pivotally connected together by a pivot pin 90 extending through the scissors pivot axis 48. Likewise, the distal end of lower frame member 26 is pivotally attached to the proximal end of upper frame member 36 by a pin 91 coincident with the scissors pivot axis 48. The proximal ends of the lower frame members 24, 26 are rigidly affixed to the elongated sleeve or tube 52 of lower mounting assembly 44. Likewise, the distal ends of upper frame members 34, 36 are rigidly affixed to the elongated sleeve 66 of upper mounting assembly 46.

The power hinge assembly 50 is comprised essentially of a guide link assembly 100 pivotally attached near the distal ends of the lower frame members 24, 26 and a lift link assembly 118 pivotally attached to the guide link assembly 100 and to the upper frame members 34, 36, as will be described in more detail below. The blind end of the hydraulic cylinder 40 is attached by bracket 76 to the tube 52 of lower mounting assembly 44, and the rod end of the cylinder 40 is connected to the guide link assembly 100.

Figure 8:
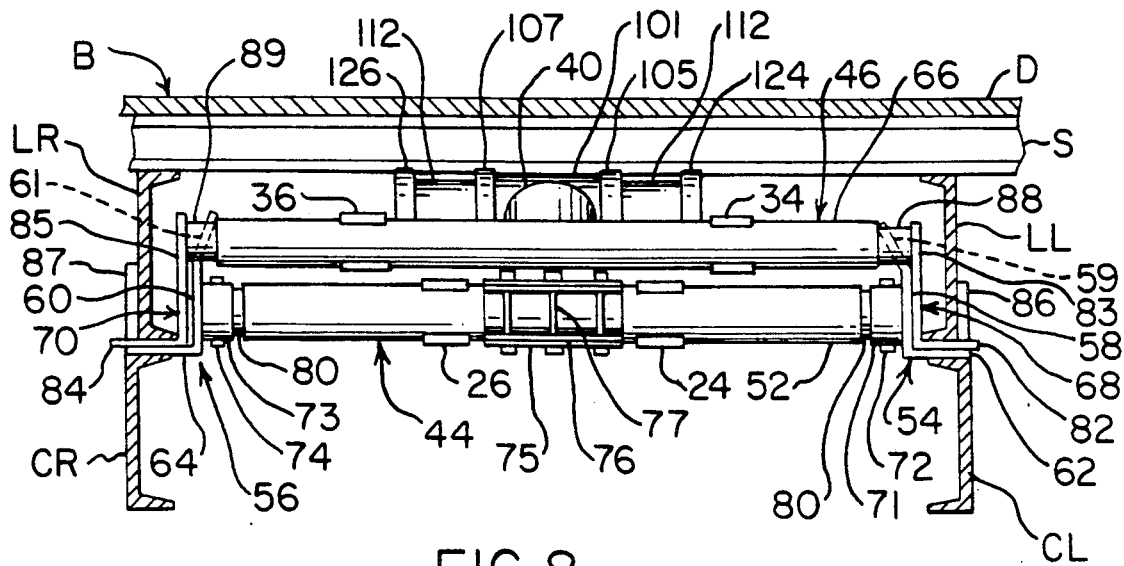
FIG. 8 is a front elevation view of the power hinge hoist of the present invention as viewed from a section through the truck chassis and body taken along line 8—8 of FIG. 6.

The lower mounting assembly 44, as best seen in FIGS. 8 and 11, is shown comprising a transverse, elongated sleeve or tube 52, which is rigidly affixed to the lower frame member 24, 26, as described above. A pair of lower mounting plates 54, 56 are positioned adjacent the opposite ends of sleeve 52. Mounting plate 54 is substantially in the form of an angle piece that has a horizontal section 62, a vertical section 58, and an inwardly sloped section 59 at its upper end. A short sleeve 71 is affixed to the inside surface of the vertical section 58. Likewise, lower mounting plate 56 at the opposite end of tube 52 also has a horizontal section 64, a vertical section 60, and an inwardly sloped upper end 61. A short sleeve 73 is affixed to the inside surface of the vertical section 60. When in the proper position, an elongated shaft 80 extends through sleeve 52, and its ends are inserted into sleeves 71, 73, respectively. Pins 72, 74 are inserted through the sleeves 71, 73, respectively, and through the ends of the shaft 80 to secure the shaft 80 and the assembly 44 together.

The horizontal sections 62, 64 of mounting plates 54, 56 are positioned on the top surfaces of the left and right chassis frame members CL, CR, respectively. The mounting plates 54, 56 are attached to the chassis frame members in an appropriate manner so that they are immovable with respect thereto. When the hoist 20 is mounted to the truck chassis in this manner, as the distal ends of the lower frame members 24, 26 move upwardly and downwardly, the proximal ends pivot about the axis 38 (shown in FIG. 7) formed by shaft 80.

A forked bracket 75 is positioned over the sleeve 52 to attach the blind end of the cylinder 40 thereto. A retainer plate 76 is fastened to bracket 75 by bolts 77 to retain the bracket 75 on the sleeve 52. The blind end of cylinder 40 does not necessarily have to be attached to pivot about the axis 38 formed by the shaft 80, but it is convenient to do so in this manner.

The upper mount assembly as also shown in FIGS. 8 and 11 can include an elongated tube or sleeve 66 with a pair of upper mounting plates 68, 70 pivotally attached to opposite ends of the tube 66. Mounting plate 68 is in the form of an angle piece that has a horizontal section 82 and a vertical section 83, with a cylindrical shaft 88 affixed to the inside surface of the vertical section 83. Likewise, the upper mounting plate 70 has a horizontal section 84 and a vertical section 85 with a cylindrical shaft 89 affixed to the inside surface of the vertical section 85. The short shafts 88, 89 are aligned to be inserted into the respectively opposite ends of sleeve 66 a sufficient distance so that sleeve 66 is confined to pivot or rotate about an upper mount axis 65 (shown in FIG. 7) defined by the shafts 88, 89.

The vertical sections 83, 85 are preferably spaced to be positioned just outside the vertical sections 58, 60 of the lower mounting plates 54, 56. The tube 66 is rigidly attached to the upper frame members 34, 36. Therefore, as the lower frame members are lowered downwardly toward the lower mounting assembly 44, the inwardly slanted ends 59, 61 of lower mounting plates 54, 56 guide the upper mounting plates 68, 70 into the nested position on the lower mounting plates 54, 56, as shown in FIGS. 8 and 11.

Figure 10:
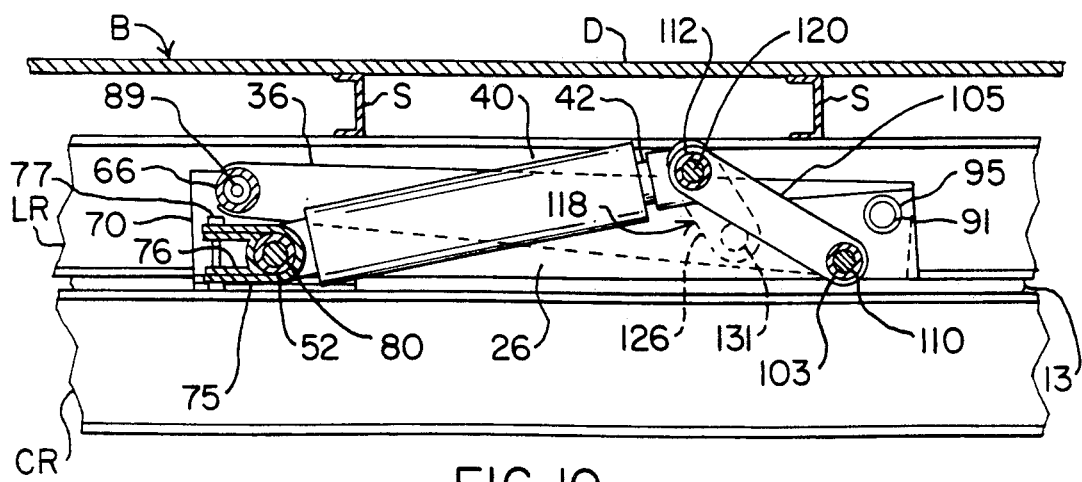
FIG. 10 is a side elevation view, partially in section, of the power hinge hoist of the present invention to illustrate the operating components and concept thereof, this section taken essentially along line 10—10 of FIG. 7.

The left and right longitudinal frame members LL, LR of the dump body B are positioned with their bottom surfaces resting on and supported by the horizontal sections 82, 84 of the upper mounting plates 68, 70, respectively. Outside retainers 86, 87 can be welded or otherwise affixed to the outer end of the horizontal sections 82, 84, respectively, to retain the longitudinal frame members LL, LR nested in the upper mounting plates 68, 70, as shown in FIGS. 8 and 11. Therefore, an upward or lifting force applied to the upper mounting assembly 46 by the hydraulic cylinder and power hinge assembly 50 effectively transfers the lifting force via upper mounting plates 68, 70 to the longitudinal frame members LL, LR of the body B. Hence, the hoist 20 can lift the front of the body B to the raised position as illustrated in FIG. 1. Of course, lowering the hoist 20 allows the longitudinal frame members LL, LR of body B and the upper mounting plates 68, 70 to return to their nested positions on the chassis frame members CL, CR, as illustrated in FIGS. 8 and 11. It is common to include a spacer or shim member 13 between the chassis frame members and the longitudinal body frame members, as shown in FIGS. 6 and 10, to make up the spacing difference between those frame members caused by the upper and lower mounting plates 54, 56, 68, 70.

As best seen by reference to FIGS. 6, 7, 10, and 12, the distal ends of lower frame members 24, 26 are pivotally connected to the proximal ends of the upper frame members 34, 36 by pivot pins 90, 91. A transverse sleeve 93 is preferably welded into the distal nd of lower frame member 24. Likewise, a transverse sleeve 95 is welded into the distal end of lower frame member 26. Similar sleeves 92, 94 are welded into the proximal ends of upper frame members 34, 36 in alignment with the sleeves 93, 95 in the lower frame members 24, 26, respectively. Pin 90 is inserted through sleeves 92, 93, and pin 91 is inserted through sleeves 94, 95, as best seen in FIG. 12. A bolt or pin 96 extending through sleeve 93 and through shaft 90 retains shaft 90 in place. Likewise, a bolt or pin 97 extending through sleeve 95 and through shaft 91 retains shaft 91 in position. In this manner, the lower frame members 24, 26 are pivotally attached to the upper frame members 34, 36 so that they can be pivoted in relation to each other about the scissors folding axis 48, which is coincident with the axes of shafts or pins 90, 91, as shown in FIG. 7.

The guide link assembly 100, as best seen in FIGS. 6, 7, 9, 10, and 12, is comprised of two parallel elongated guide links 105, 107 positioned in parallel, spaced-apart relation to each other. A transverse sleeve 103 is affixed between the lower ends of guide links 105, 107. Gusset plates 109, 111 are welded to sleeve 103 and to the inside surfaces of links 105, 107, respectively, to strengthen the guide link assembly 100. Sleeves 98, 99 are attached transversely through the lower frame members 24, 26 in a position slightly ahead of, and lower than, the scissors axis 48. The guide link assembly 100 is pivotally attached to the lower frame members 24, 26 by an elongated shaft or pin 110 extending through the sleeves 98, 99 in lower frame members 24, 26, respectively, and through sleeve 103 of the guide link assembly 100. The guide link pin 110 defines the guide link axis 115 (shown in FIG. 7).

Figure 14:
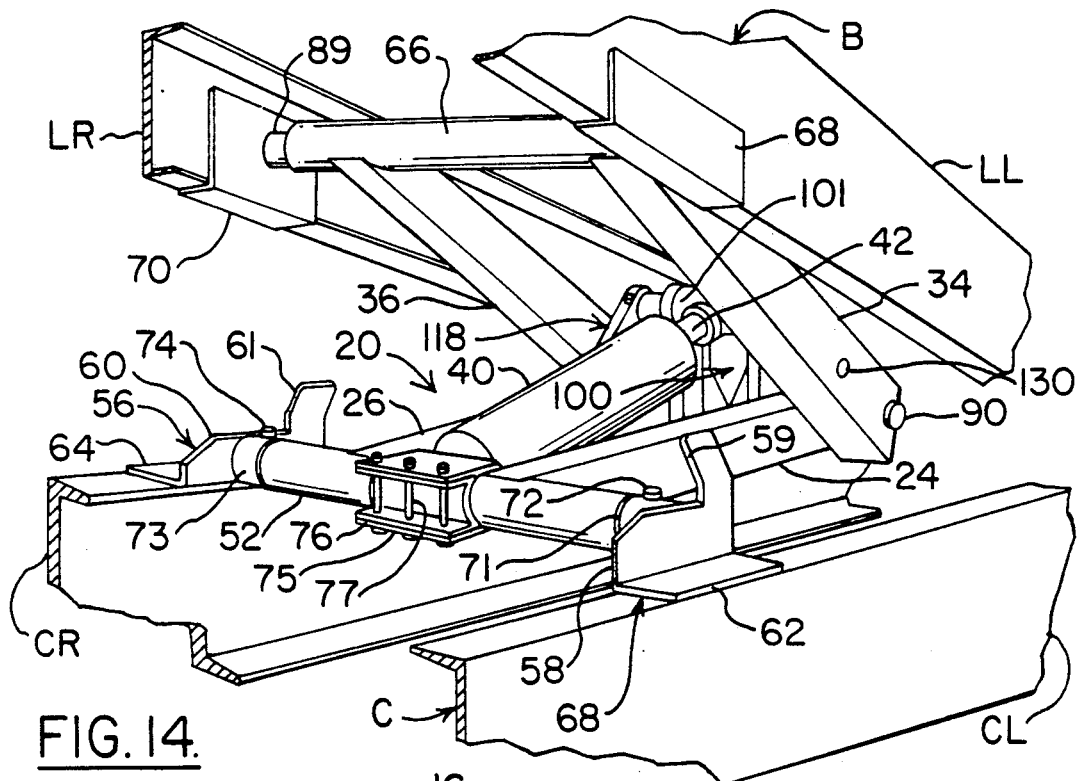
FIG. 14 is a perspective view of the power hinge hoist of the present invention mounted on the truck chassis and under the truck body and shown in a partially raised position.

At the upper end of the guide link assembly 100, an elongated tube 112 extends through the upper ends of guide links 105, 107, respectively, and outwardly in opposite directions therefrom a sufficient distance to span the distance over the tops of the lower frame members 24, 26. This structure is best seen by reference to FIGS. 7, 9, and 13. This elongated tube 112 is preferably welded or otherwise rigidly affixed to the upper ends of guide links 105, 107 after a larger sleeve 101 is positioned concentrically around the portion of tube 112 that spans the distance between guide links 105, 107. Therefore, the large sleeve 101 is rotatable or pivotal around the elongated tube 112, which defines the power hinge axis 116 (shown in FIG. 7). As best shown in FIGS. 7, 10, and 14, the rod end 42 of cylinder 40 is connected to the guide link assembly 100 by attaching it to this pivotal sleeve 101.

The lift link assembly 118 is best described by reference to FIGS. 7, 10, and 13. Specifically, a pair of lift links 124, 126 are pivotally attached to both the guide link assembly 100 and to the upper frame members 34, 36. One end of each lift link 124, 126 is pivotally connected to the guide link assembly 100 by mounting on an elongated lift link pin 120 that coincides with power hinge axis 116 and extends through tube 112 and into the lift links 124, 126. The lift links 124, 126 are retained on the ends of lift link pin 120 by transverse bolts or pins 122, 123.

The opposite ends of the lift links 124, 126 are pivotally attached to the mid-portions of the upper frame members 34, 36, preferably closer to the scissors axis 48 than to the upper mounting axis 65. Also, in order to enhance the mechanical advantage, as well as the low profile and compactness of the hoist 20, the guide link axis 115 is kept as low as practicably possible.

As shown in FIG. 13, the lower ends of lift links 124, 126 are pivotally connected to the upper frame members 34, 36 by attachment pins 130, 131 inserted through transverse sleeves 128, 129, which are fastened to the frame members 34, 36 and define the lift point axis 135 (shown in FIG. 7). The lift links 124, 126 are retained in attached relation to the pins 130, 131 by bolts or pins 132, 133.

The locations of the scissors axis 48, guide link axis 115, power hinge axis 116, and lift point axis 135 have varying effects on the mechanical advantage of the hoist 20. The power hinge assembly 50 has a large built-in mechanical advantage at the beginning of the lift when the load on the hoist is greatest. As the hoist 20 is extended, the power hinge assembly 50 provides a continuously variable, generally non-linear decrease in mechanical advantage. This decrease is acceptable since the load on the hoist decreases as the dump body B is raised. Because of this change in mechanical advantage during the extension cycle, it becomes important not only to ensure that there is sufficient mechanical advantage at the beginning of the lift, but also that the mechanical advantage throughout the remainder of the extension cycle does not decrease to the point where the hoist can no longer raise the dump body B. Therefore, the pivotal axes must be located to provide sufficient mechanical advantage to overcome the load requirements imposed throughout the entire extension cycle.

A certain pivotal axes relationship must be maintained when tailoring the mechanical advantage of the hoist to the loads imposed by dump body B. For example, the hoist 20 will only operate when the distance between the guide link axis 115 and power hinge axis 116 plus the distance between the power hinge axis 116 and the lift point axis 135 exceeds the distance between the lift point axis 135 and scissors axis 48 plus the distance between scissors axis 48 and guide link axis 115.

As shown by FIGS. 8 through 13, the collapsed hoist 20 has a very low, compact profile with the upper frame members 34, 36 in nearly parallel alignment with the lower frame members 24, 26. Also, as best illustrated in FIGS. 6, 8, 9, 10 and 11, the collapsed hoist 20, according to this invention, fits between the truck chassis and the cross sills of the body B without having to cut or modify any of the cross sills S. Even in installations where the upper part of the collapsed hoist may protrude slightly above the top level of the longitudinal body frame members, such protrusion is so slight that it can be positioned between cross sills, yet no structural modification to the body B or to the chassis are necessary.

In operation, the hydraulic cylinder 40 is actuated to extend the rod 42 in a conventional manner to open or raise the hoist 20. As rod 42 extends, the extension force from the cylinder 40 is applied through sleeve 101 to both the guide link assembly 100 and to the lift link assembly 118. This extension causes the guide links 105, 107 to pivot about the guide link pin 110 and axis 115 as indicated by the arrow 141 in FIG. 16. Early in the extension cycle, the lift links 124, 126 are also caused to pivot about the pins 130, 131 and axis 135 as indicated by the arrow 142 in FIG. 16.

Figure 17:
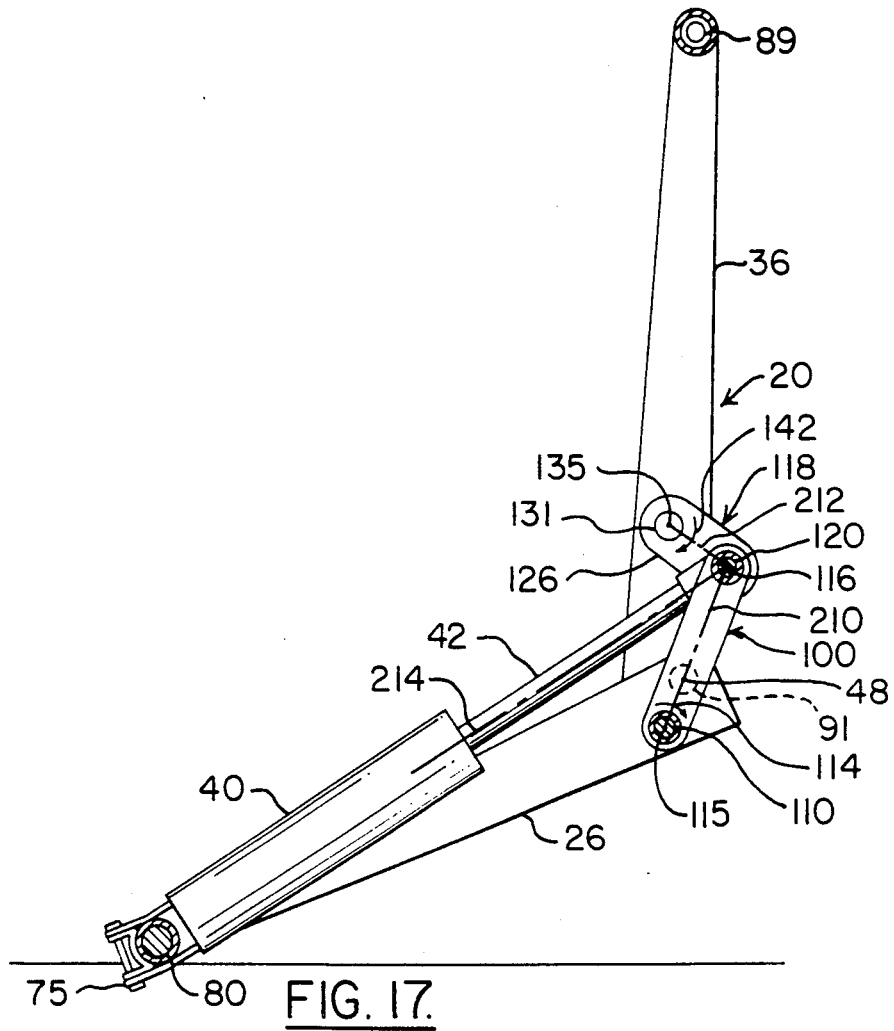
FIG. 17 is a cross sectional view of the power hinge hoist of the present invention similar to FIG. 16, but in the completely raised position.
Figure 15:
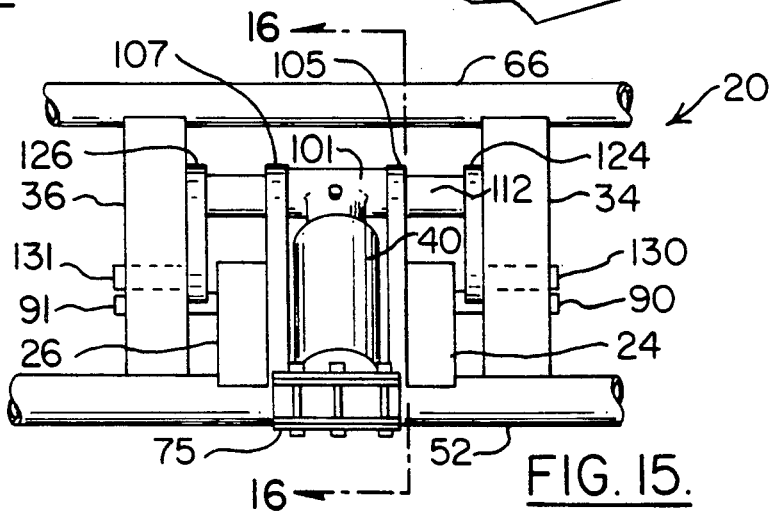
FIG. 15 is a front elevation view of the power hinge hoist of the present invention shown in the partially raised position of FIG. 14.
Figure 16:
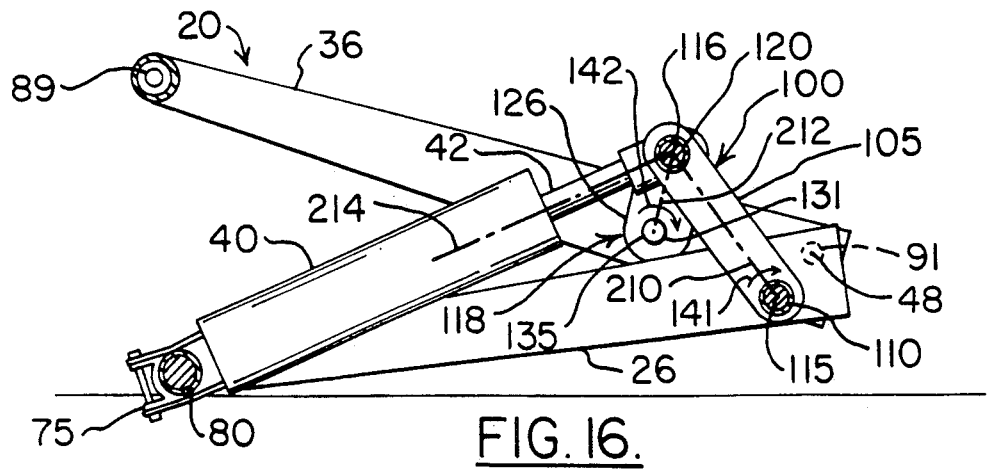
FIG. 16 is a side elevation view of the partially raised power hinge hoist of the present invention, this view being partially in section taken along line 16—16 of FIG. 15.

However, the lift links 124, 126 may not always continue to pivot in the direction indicated by arrow 142 in FIG. 16. The pivot rotation will stop and reverse direction when the guide link centerline 210 crosses the scissors axis 48, as shown in FIG. 17. Whether or not this occurs during the extension cycle will depend upon the specific configuration of the pivotal axis 48, 115, 116, and 135 and the amount of hoist extension desired. The extension force from cylinder 20 acting on the power hinge assembly 50 places the lift links 124, 126 and the guide links 105, 107 under varying structural loads. In the preferred embodiment, the lift links 124, 126 are always loaded in tension, while the guide links 105, 107 are loaded in compression until the rotation of the power link assembly 50 during the extension cycle causes the imaginary line 212 between axes 135 and 116 to cross the line of action or axis 214 of the cylinder extension force whereupon the loading on guide links 105, 107 changes from compression to tension. Thus, as the rod 42 of the cylinder 40 is extended and the guide link assembly 100 is rotated in the direction of arrow 141, a lifting force is applied to the upper frame members 34, 36 to result in lifting the dump body B, as illustrated in FIG. 14. The hoist 20 is illustrated in the partially opened position in FIGS. 14, 15, and 16. As the rod 42 continues to extend, the guide link assembly 100 continues to rotate as indicated by arrow 141 about pin 110, which results in a continuing lift force in the direction of arrow 143 until the hoist 20 reaches the full open position, as shown in FIG. 17. During this opening operation, the lift links 124, 126 continue to rotate about pins 130, 131, but, of course, may stop and reverse direction, as indicated above.

This power link arrangement 50 as described above provides a very large mechanical advantage when the hoist 20 is initially started in the collapsed position of FIGS. 6 and 10 to lift the body B. The mechanical advantage is a function of the distances and the angular relationships between all of the pivotal axes described above and the scissor axis 48 through scissors pivot pins 90, 91. The distances between the various pins or axes can be set or designed as desired to provide the mechanical advantage required to lift a designed load.

Generalizations regarding the effects of all possible configurations on the mechanical advantage of the hoist are extremely difficult, because of the complex leverages and interplay between the linkage components. While the mechanical advantage of the hoist depends on the distances and angular relationships between all of the pivotal axes described above, it is also interdependent on these parameters. Consequently, a change which may provide a large mechanical advantage at lift-off may well reduce it too much midway through the extension cycle. However, there are several parameters that have a predictable effect on the mechanical advantage of the hoist. For example, the length of the lift links 124, 126, the length of guide links 105, 107, and the distance between pivotal axes 115 and 135 have no effect on the initial mechanical advantage. However, the length of the guide links 105, 107 are important in maintaining enough mechanical advantage later in the extension cycle.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to falling within the scope of the invention as defined by the claims which follow.

The embodiments of the invention in which an exclusive property right or privelege is claimed are defined as follows:

1. In a scissors-type hoist for a dump truck body which has an upper frame and a lower frame pivotally connected together at a scissors axis, one end of the lower frame opposite the scissors axis being pivotally attached to the truck chassis frame and one end of the upper frame opposite the scissors axis being connected to the dump body, and a hydraulic cylinder with a hydraulically extendable and retractable rod for pivoting the upper frame in relation to the lower frame about the scissors axis, the improvement comprising:

a power hinge including an elongated guide link pivotally attached at one end to the lower frame and a lift link pivotally attached at one end to the upper frame, the other ends of said guide link and said lift link being pivotally connected together, wherein the hydraulic cylinder is pivotally connected at one end to the lower frame and at the other end to said power hinge, and wherein the axis of connection of the lift link to the upper frame and the scissors axis are disposed on opposite sides of the guide link said power hinge increasing the mechanical advantage of the hoist at and near its folded condition by multiplying the force of the hydraulic cylinder as it is applied to the upper frame.

2. The improvement of claim 1, wherein the distance between the scissors axis and the axis of attachment of the guide link to the lower frame is different from the distance between the scissors axis and the axis of attachment of the lift link to the upper frame.

3. The improvement of claim 2, wherein the distance between the scissors axis and the axis of attachment of the guide link to the lower frame is less than the distance between the scissors axis and the axis of attachment of the lift link to the upper frame.

4. The improvement of claim 3, wherein the distance between the axis of attachment of the guide link to the lower frame and the axis of attachment of the lift link to the upper frame in the closed condition is less than the distance between the axis of attachment of the guide link to the lower frame and the axis of attachment of the guide link to the lift link.

5. The improvement of claim 4, wherein the hydraulic cylinder is connected to the guide and lift links at the axis of connection of the guide link to the lift link.

6. The improvement of claim 5, wherein the axis of connection of the guide link to the lower frame is lower than the scissors axis when the hoist is in the closed condition.

7. The improvement of claim 6, wherein the axis of connection of the lift link to the upper frame is lower than the scissors axis when the hoist is in the closed condition.

8. The improvement of claim 5, wherein the lower frame is comprised of two elongated lower frame members in parallel, spaced apart relation to each other, each being adapted for being pivotally connected at their proximal ends to the truck chassis, the upper frame is comprised of two elongated upper frame members positioned in parallel, spaced apart relation to each other, each being adapted for being pivotally connected at their distal ends to the dump body, said upper frame members having said lower frame members positioned therebetween, the distal ends of said lower frame members being pivotally attached to the adjacent proximal ends of said upper frame members at said scissors axis, said guide link being positioned between said lower frame members and pivotally attached thereto, two lift links, positioned in parallel, spaced apart relation to each other, each being adapted for being pivotally connected at their proximal ends to said upper frame members, the distal ends of said lift links being pivotally attached to said guide link, and said hydraulic cylinder being positioned between said lower frame members and being connected to said lift links and to said guide link between said lower frame members.

9. The improvement of claim 5, wherein said upper and lower frame members are narrower in height when in the closed position than the distance between the truck chassis and the cross sills of the dump body.

10. The improvement of claim 1 wherein said power hinge means includes an elongated guide link pivotally attached at one end to the lower frame at a guide link axis and a lift link pivotally attached at one end to the upper frame at a lift point axis, the other ends of the guide link and the lift link being pivotally connected together at a power hinge axis, and wherein the distance between the guide link axis on the guide link and the power hinge axis on the guide link when added to the distance between the power hinge axis on the lift link and the lift point axis on the lift link exceeds the distance between the lift point axis on the upper frame and the scissors axis on the upper frame when added to the distance between the scissors axis on the lower frame and the guide link axis on the lower frame.

11. In a scissors-type hoist for a dump truck body pivotally mounted on a truck chassis frame, wherein said hoist has an upper frame and a lower frame pivotally connected together at a scissors axis, one end of the lower frame opposite the scissors axis being pivotally attached to the truck chassis frame and one end of the upper frame opposite the scissors axis being pivotally connected to the dump body, and a hydraulic cylinder with a hydraulically extendable and retractable rod for pivoting the upper frame in relation to the lower frame about the scissors axis, the improvement comprising:
an elongated guide link pivotally attached at one end to the lower frame;
a lift link pivotally attached at one end to the upper frame such that the distance between the scissors axis and the axis of attachment of the guide link to the lower frame is less than the distance between the scissors axis and the axis of attachment of the lift link to the upper frame, and such that the distance between the axis of attachment of the guide link to the lower frame and the axis of attachment of the lift link to the upper frame when the upper frame and lower frame are at and proximate a closed condition where the truck body is resting on the truck chassis frame is less than the distance between the axis of attachment of the guide link to the lower frame and the axis of attachment of the guide link to the lift link, and wherein the axis of connection of the guide link to the lower frame is lower than the scissors axis when the hoist is in the near the closed condition, the other ends of the guide link and lift link being pivotally connected together, wherein said hydraulic cylinder is pivotally connected at one end to the lower frame and at the other end to the pivotally connected guide and lift links.

12. The scissors-type hoist of claim 11, wherein the axis of connection of the lift link to the upper frame is lower than the scissors axis when the hoist is in the closed condition.

13. The scissors-type hoist of claim 11, wherein the lower frame is comprised of two elongated lower frame members in parallel, spaced apart relation to each other, each being adapted for being pivotally connected at their proximal ends to the truck chassis, the upper frame is comprised of two elongated upper frame members positioned in parallel, spaced apart relation to each other, each being adapted for being pivotally connected at their distal ends to the dump body, said upper frame members having said lower frame members positioned therebetween, the distal ends of said lower frame members being pivotally attached to the adjacent proximal ends of said upper frame members at said scissors axis, said guide link being positioned between said lower frame members and pivotally attached thereto, two lift links, positioned in parallel, spaced apart relation to each other, each being adapted for being pivotally connected at their proximal ends to said upper frame members, the distal ends of said lift links being pivotally attached to said guide link, and said hydraulic cylinder being positioned between said lower frame members and being pivotally connected to said lift links and to said guide link between said lower frame members.

14. In a scissors-type hoist for a dump truck body, which has an upper frame and a lower frame pivotally connected together at a scissors axis, one end of the lower frame opposite the scissors axis being pivotally attached to the truck chassis frame and one end of the upper frame opposite the scissors axis being connected to the dump body, and a hydraulic cylinder with a hydraulically extendable and retractable rod for pivoting the upper frame in relation to the lower frame about the scissors axis, the improvement comprising:
an elongated guide link pivotally attached at one end to the lower frame;
a lift link pivotally attached at one end to the upper frame, the other ends of said guide link and said lift link being pivotally connected together, said lift link defining a first line of action which passes through the pivotal connection of said lift link on the upper frame and the pivotal connection connecting said guide and lift links together, and wherein the hydraulic cylinder is pivotally connected at one end to the lower frame and at the other end to said pivotally connected guide and lift links, the hydraulic cylinder defining a second line of action which passes through the pivotal connection of said hydraulic cylinder on said lower frame and the pivotal connection of said hydraulic cylinder on said pivotally connected guide and lift links, said guide link and said lift links being arranged such that the perpendicular distance from the first line of action to the scissors axis is substantially greater than the perpendicular distance from the second line of action to the scissors axis in the closed condition.

* * * * *